(12) United States Patent
Junger

(10) Patent No.: US 7,840,439 B2
(45) Date of Patent: Nov. 23, 2010

(54) RF-ID PRODUCT TRACKING SYSTEM WITH PRIVACY ENHANCEMENT

(75) Inventor: Peter J. Junger, Redmond, WA (US)

(73) Assignee: Nintendo of America, Inc., Redmond, WA (US)

( * ) Notice: Subject to any disclaimer, the term of this patent is extended or adjusted under 35 U.S.C. 154(b) by 1743 days.

(21) Appl. No.: 10/983,337

(22) Filed: Nov. 8, 2004

(65) Prior Publication Data

US 2005/0131763 A1    Jun. 16, 2005

Related U.S. Application Data

(60) Provisional application No. 60/518,326, filed on Nov. 10, 2003.

(51) Int. Cl.
*G06Q 20/00* (2006.01)
*G08B 13/14* (2006.01)
*G06K 19/06* (2006.01)

(52) U.S. Cl. .................... 705/23; 705/16; 705/20; 340/572.4; 235/492

(58) Field of Classification Search .............. 705/26–29
See application file for complete search history.

(56) References Cited

U.S. PATENT DOCUMENTS

| 789,106 | A | 5/1905 | Seymour |
|---|---|---|---|
| 1,330,368 | A | 2/1920 | Boos |
| 1,393,489 | A | 10/1921 | Boos |
| 1,476,819 | A | 12/1923 | Hope |
| 4,312,037 | A | 1/1982 | Yamakita |
| 4,414,467 | A | 11/1983 | Gould et al. |
| 4,458,802 | A | 7/1984 | Maciver et al. |
| 4,563,739 | A | 1/1986 | Gerpheide et al. |
| 4,598,810 | A | 7/1986 | Shore et al. |
| 4,668,150 | A | 5/1987 | Blumberg |
| 4,734,005 | A | 3/1988 | Blumberg |
| 4,750,119 | A | 6/1988 | Cohen et al. |
| 4,789,054 | A | 12/1988 | Shore et al. |
| 4,792,018 | A | 12/1988 | Humble et al. |

(Continued)

FOREIGN PATENT DOCUMENTS

DE       3 315 724       10/1984

(Continued)

OTHER PUBLICATIONS

Information Disclosure Statement files in U.S. Appl. No. 09/509,021, on Oct. 26, 2001.
Information Disclosure Statement filed in U.S. Appl. No. 09/065,552, on Jul. 19, 1999.
Information Disclosure Statement filed in U.S. Appl. No. 08/725,259, on Oct. 5, 1998.

(Continued)

*Primary Examiner*—F. Ryan Zeender
*Assistant Examiner*—H. Rojas
(74) *Attorney, Agent, or Firm*—Nixon & Vanderhye, P.C.

(57) ABSTRACT

A method for using electronic product identification devices to track product sales and enable sales transactions to be registered in an electronic registration (ER) system without causing privacy or security concerns for the purchasers. RF-ID devices are placed on products being sold and include detailed information about the products. When the products are purchased, the detailed information is loaded into an ER database and all but a limited amount of information is removed from the RF-ID device. The limited information is sufficient to enable the detailed information to be located in the ER database by authorized individuals in connection with a return transaction or the like.

13 Claims, 2 Drawing Sheets

U.S. PATENT DOCUMENTS

| | | |
|---|---|---|
| 4,803,348 A | 2/1989 | Lohrey et al. |
| 4,812,629 A | 3/1989 | O'Neil et al. |
| 4,814,592 A | 3/1989 | Bradt et al. |
| 4,839,505 A | 6/1989 | Bradt et al. |
| 4,858,743 A | 8/1989 | Paraskevakos et al. |
| 4,866,661 A | 9/1989 | De Prins |
| 4,871,054 A | 10/1989 | Murray |
| 4,884,212 A | 11/1989 | Stutsman |
| 4,893,705 A | 1/1990 | Brown |
| 4,896,024 A | 1/1990 | Morello et al. |
| 4,903,815 A | 2/1990 | Hirschfeld et al. |
| 4,967,906 A | 11/1990 | Morello et al. |
| 4,984,155 A | 1/1991 | Geier et al. |
| 4,997,076 A | 3/1991 | Hirschfeld et al. |
| 5,007,518 A | 4/1991 | Crooks et al. |
| 5,020,958 A | 6/1991 | Tuttobene |
| 5,028,766 A | 7/1991 | Shah |
| 5,042,686 A | 8/1991 | Stucki |
| 5,128,520 A | 7/1992 | Rando et al. |
| 5,128,527 A | 7/1992 | Kawai et al. |
| 5,133,441 A | 7/1992 | Brown |
| 5,139,384 A | 8/1992 | Tuttobene |
| 5,143,193 A | 9/1992 | Geraci |
| 5,159,560 A | 10/1992 | Newell et al. |
| 5,216,612 A | 6/1993 | Cornett et al. |
| 5,231,569 A | 7/1993 | Myatt et al. |
| 5,256,863 A | 10/1993 | Ferguson et al. |
| 5,257,741 A | 11/1993 | Rode et al. |
| 5,273,183 A | 12/1993 | Tuttobene |
| 5,311,424 A | 5/1994 | Mukherjee et al. |
| 5,372,386 A | 12/1994 | Mills |
| 5,375,240 A | 12/1994 | Grundy |
| 5,414,252 A | 5/1995 | Shinoda et al. |
| 5,416,306 A | 5/1995 | Imahata |
| 5,478,990 A | 12/1995 | Montanari et al. |
| 5,520,990 A | 5/1996 | Rotermund |
| 5,521,815 A | 5/1996 | Rose, Jr. |
| 5,537,314 A | 7/1996 | Kanter |
| 5,541,394 A | 7/1996 | Kouchi et al. |
| 5,581,064 A | 12/1996 | Riley et al. |
| 5,602,377 A | 2/1997 | Beller et al. |
| 5,671,279 A | 9/1997 | Elgamal |
| 5,712,989 A | 1/1998 | Johnson et al. |
| 5,721,832 A | 2/1998 | Westrope et al. |
| 5,737,726 A | 4/1998 | Cameron et al. |
| 5,745,036 A | 4/1998 | Clare |
| 5,799,285 A | 8/1998 | Klingman |
| 5,804,803 A | 9/1998 | Cragun et al. |
| 5,857,175 A | 1/1999 | Day et al. |
| 5,889,270 A | 3/1999 | Van Haagen et al. |
| 5,895,453 A | 4/1999 | Cook |
| 5,913,210 A | 6/1999 | Call |
| 5,918,213 A | 6/1999 | Bernard et al. |
| 5,918,214 A | 6/1999 | Perkowski |
| 5,949,335 A | 9/1999 | Maynard |
| 5,950,173 A | 9/1999 | Perkowski |
| 5,966,450 A | 10/1999 | Hosford et al. |
| 5,968,110 A | 10/1999 | Westrope et al. |
| 5,978,774 A | 11/1999 | Rogers et al. |
| 5,984,508 A | 11/1999 | Hurley |
| 6,014,635 A | 1/2000 | Harris et al. |
| 6,016,480 A | 1/2000 | Houvener et al. |
| 6,018,719 A * | 1/2000 | Rogers et al. ............... 705/24 |
| 6,025,780 A | 2/2000 | Bowers et al. |
| 6,029,139 A | 2/2000 | Cunningham et al. |
| 6,029,141 A | 2/2000 | Bezos et al. |
| 6,039,244 A | 3/2000 | Finsterwald |
| 6,049,778 A | 4/2000 | Walker et al. |
| 6,055,511 A | 4/2000 | Luebbering et al. |
| 6,064,979 A | 5/2000 | Perkowski |
| 6,085,167 A | 7/2000 | Iguchi |
| 6,085,172 A | 7/2000 | Junger |
| 6,105,001 A | 8/2000 | Masi et al. |
| 6,115,690 A | 9/2000 | Wong |
| 6,119,099 A | 9/2000 | Walker et al. |
| 6,119,164 A | 9/2000 | Basche |
| 6,125,352 A | 9/2000 | Franklin et al. |
| 6,131,088 A | 10/2000 | Hill |
| 6,134,533 A | 10/2000 | Shell |
| 6,148,249 A | 11/2000 | Newman |
| 6,154,738 A | 11/2000 | Call |
| 6,219,652 B1 | 4/2001 | Carter et al. |
| 6,222,914 B1 | 4/2001 | McMullin |
| 6,269,344 B1 | 7/2001 | Junger |
| 6,317,028 B1 | 11/2001 | Valiulis |
| 6,463,421 B2 | 10/2002 | Junger |
| 6,542,933 B1 | 4/2003 | Durst et al. |
| 6,550,685 B1 | 4/2003 | Kindberg |
| 6,554,187 B2 | 4/2003 | Otto |
| 6,697,812 B1 | 2/2004 | Martin |
| 6,757,663 B1 | 6/2004 | Rogers et al. |
| 6,933,848 B1 * | 8/2005 | Stewart et al. ........... 340/572.3 |
| 7,000,834 B2 * | 2/2006 | Hind et al. .................. 235/385 |
| 7,118,478 B2 | 10/2006 | Fayter et al. |
| 2002/0032612 A1 | 3/2002 | Williams et al. |
| 2002/0116274 A1 | 8/2002 | Hind et al. |
| 2003/0094494 A1 | 5/2003 | Blanford et al. |
| 2003/0126034 A1 | 7/2003 | Cheney et al. |
| 2003/0141358 A1 | 7/2003 | Hudson et al. |
| 2004/0054900 A1 | 3/2004 | He |
| 2004/0153344 A1 | 8/2004 | Bui et al. |
| 2004/0172260 A1 | 9/2004 | Junger et al. |
| 2004/0195341 A1 | 10/2004 | Lapstun et al. |
| 2005/0100144 A1 | 5/2005 | O'Connor |
| 2006/0175401 A1 | 8/2006 | Roberts |

FOREIGN PATENT DOCUMENTS

| | | |
|---|---|---|
| EP | 0 068 642 | 1/1983 |
| EP | 0 191 636 | 8/1986 |
| EP | 0 286 130 | 10/1988 |
| EP | 0 349 284 | 1/1990 |
| EP | 0 845 749 | 6/1998 |
| EP | 0 862 154 | 9/1998 |
| FR | 2 559 599 | 8/1985 |
| GB | 2 143 662 | 2/1985 |
| GB | 2 203 879 | 10/1988 |
| GB | 2 209 157 | 5/1989 |
| GB | 2 209 158 | 5/1989 |
| JP | 02-139698 | 5/1990 |
| JP | 405178422 A | 7/1993 |
| JP | 405342482 A | 12/1993 |
| JP | 10188141 | 7/1998 |
| JP | 11066176 | 3/1999 |
| WO | 87/00948 | 2/1987 |
| WO | 88/02524 | 4/1988 |
| WO | 88/06771 | 9/1988 |
| WO | 89/09460 | 10/1989 |
| WO | 92/01273 | 1/1992 |
| WO | 99/33016 | 7/1999 |

OTHER PUBLICATIONS

Nintendo Point of Purchase Mail-In Card.
1994 Nintendo Product Returns Policies and Procedures.
1995 Nintendo Product Returns Policies and Procedures.
1996 Nintendo Product Returns Policies and Procedures.
1992 Nintendo Product Returns Policy.
John Longwell, "Robec Links Its 18 Sales Facilities Via Newly Adopted NetWare System", Computer Reseller News, Sep. 6, 1993.
Software Maker Promises Many Happy Returns, Drug Topics, Mar. 4, 1996, vol. 140, No. 5, pp. 124-128.
Direct Return 2000, Software Overview, http://www.directreturn.com/software_overview.htm, Oct. 2, 2000.

Amazon.com Returns Policy, Our Return Policy is Simple, Jun. 20, 2000, Amazon.com, www.amazon.com/exec/obidos/subst/help/returns-policy.html, pp. 1-2.

Leyden, "Burgled mum finds stolen iPod on eBay," The Register, May 17, 2005, 1 page.

"Man accused in Lego selling scam," http://www.kptv.com/Global/story.asp?S=4137050&nav=munil56_2, Nov. 18, 2005, 1 page.

Grace, "Reseller Profile—Reynolds and Reynolds; Reynolds goes extra mile—Evolving solutions continue to fuel clients' capabilities", Computer Reseller News, CMP Publications, Inc., Feb. 21, 1994, 2 pages.

PR Newswire, "CompuServe Introduces Electronic Product Registration Software", PR Newswire Association, Inc., Mar. 10, 1994, 2 pages.

Longwell, "Western Digital Wins—Price/performance gives driver maker victory margin", Computer Reseller News, CMP Publications, Inc., Jun. 28, 1993, 3 pages.

Grace, "ABCD Looks to Adopt EDI Transaction Sets", Computer Reseller News, CMP Publications, Inc., Jun. 28, 1993, 2 pages.

Discount Store News, "New Policy System can Par Suspect Returns, Cut Losses", Discount Store News, Lebhar-Friedman Inc., Jan. 1, 1996, 2 pages.

Synchronics® User Manual: Point of Sale, Version 6.5, Apr. 1993 (ON 004464-ON 005116).

Synchronics® User Manual: Inventory Plus, Version 6.5, Apr. 1993 (ON 005117-ON 005892).

Collins, David Jarrett and Nancy Nasuti Whipple, Using Bar Code: Why It's Taking Over, Second Edition (ON 003696-ON 004031).

Birnbaum, Henry, General Information Manual: IBM Circulation Control at Brooklyn College Library, 29pp. (ON 001822-ON 001850.

White, Howard S., Library Technology Reports, Mar.-Apr. 1982, vol. 18,No. 2, pp. 178-184 (ON 001851-ON 001858).

Cooper, Michael D., Design of Library Automation Systems, pp. 83-109 (ON 1859-ON 001873).

Corbin, John, Developing Computer-Based Library Systems, pp. 144-149 (ON 001874-ON 001877).

DataPhase, Inc. Automated Circulation System, 43 pp. (ON 001878-ON 001904).

Dranov, Paula, Automated Library Circulation Systems, 1977-78, pp. 24-47 (ON 001905-ON 001929).

Hoadley, Irene Braden and A. Robert Thorson, An Automated On-Line Circulation System: Evaluation, Development, Use, 1973, 19 pp. (ON 001930-On 001948).

Meyer, James, "NOTIS: The System and Its Features", Library Hi Tech, Issue 10, vol. 3, No. 2, 1985, pp. 81-89 (ON 001949-ON 001959).

Dowlin, Kenneth E., "Maggie III: The Prototypical Library System", Library Hi Tech, Issue 16, vol. 4, No. 4, Winter 1986, pp. 7-15 (ON 001960-ON 001970).

Matthews, Joseph R., "Graphical User Interfaces GUI in Library Products", Library Technology Reports, vol. 32, No. 1, Jan. 1996, p. 53 (ON 001972-ON 001976).

Saffady, William, "Integrated Library Systems for Microcomputers and Mainframes: A Vendor Study", Library Techology Reports, vol. 30, No. 1, Jan. 1994, p. 5 (ON 001977-ON 002087).

Saffady, William, "Vendors of Integrated Library Systems for Minicomputers and Mainframes: An Industry Report, part 1", Library Techology Reports, vol. 33, No. 2, Mar. 1997, p. 161 (ON 002088-ON 002096).

Saffady, William, "Vendors of Integrated Library Systems for Microcomputers and Mainframes: An Industry Report, part 2", Library Techology Reports, vol. 33, No. 3, May 1997, p. 277 (ON 002097-ON 002138).

Salton, Gerard, Dynamic Information and Library Processing, pp. 62-69 (ON 002139-ON 002143).

Grosch, Audrey N., Distributed Computing and the Electronic Library: Micros to Superminis, pp. 78-79 (ON 002144-ON 002146).

Reynolds, Dennis, Library Automation: Issues and Applications, pp. 42-49 and pp. 146-149 (ON 002147-ON 002153).

Salmon, Stephen R., Library Automation Systems, p. 239 (ON 002154-ON 002155).

Synchronics Software Product Information guide, 95 pages.

Direct Return 2000, Software Overview, http://www.directreturn.com/software_overview.htm, Copyright © 2000 Pharmacy Software Solutions, Inc.

"Retailing in Cyberspace", Narda News, Apr. 1995, pp. 21-22.

PR Newswire, "Escada Offers A Garden Variety For Spring", PR Newswire Association, Inc., Mar. 10, 1994, 2 pages.

Automotive News, "Reynolds, ADP differ on superhighway progress", Crain Communications, Inc., Apr. 11, 1994, 3 pages.

Computer Reseller News, "Case Study; Tapping the Channel's 'Best in Class'", CMP Publications, Inc., Jan. 30, 1995, 2 pages.

Rigney, "User Migrates to Windows NT", InternetWeek, CMP Publications, Inc., Jan. 10, 1994, 2 pages.

Business Wire, "Multimillion-dollar Health-care Products", Business Wire, Inc. Dec. 15, 1993, 2 pages.

Margulis, "Reclaim: an efficient way to handle damaged products", U.S. Distribution Journal, BMT Publications Inc., Mar. 15, 1992, 7 pages.

Jiji Press Ticker Service, "MITI Working Out Business Practice Guidelines", JiJi Press Ltd., Apr. 20, 1990, 1 page.

Jiji Press Ticker Service, "JCCI Issues Booklet to Explain Distribution", JiJi Press Ltd., Jul. 20, 1989, 1 page.

Business Wire, "Aztech Labs Inc. is Chosen as Business Depot's 'Vendor of the Year'; Canadian Company Honors Multimedia Hardware Manufacturer as Number One in Computer Category", Business Wire, Inc., May 6, 1996, 2 pages.

LaPlante, "Rugby Darby; From proprietary host to a distributed LAN-based architecture in 2 years", InfoWorld, InfoWorld Media Group, Nov. 15, 1993, 4 pages.

Witt et al., "Distribution: a differentiator in 2000", Material Handling Engineering, Penton Publishing Inc., Oct. 1995, 15 pages.

Grotta, "Return to vendor: the right way to make mail-order returns", PC Sources, Information Access Company, A Thomson Corporation Company, ASAP Coastal Associates Publishing L.P., Feb. 1992, 10 pages.

Consumer Electronics, Warren Publishing, Inc., Consumer Electronics Personals, vol. 35, No. 6, p. 18.

Business Wire, "DataTrend receives award from AT&T Global Information Solutions", Business Wire, Inc., Nov. 7, 1995, 2 pages.

Quinn, "Why Wang took the third-party route", Information Access Company, A Thomson Corporation Company, ASAP Reed Publishing USA, vol. 30, No. 2, p. 30, Feb. 1991.

Rogers et al., "Going Backwards: Reverse Logistics Trends and Practices", Reverse Logistics Executive Council, 1998 (entire book).

IBM Systems Journal, vol. 14, No. 1, 1975, pp. 1-101.

CollegeTermPapers web page printout, "History of Fed Ex", www.collegetermpaper...rmPapers/Aviation/history_of_fed_ex.html (Aug. 24, 2001), 7 pages.

Rosenbloom, "Midnight Express", Inc., Jul. 2001, 4 pages.

Sleeper, "FedEx Pushes The Right Buttons to Remain No. 1 In Fast Shipping", Investor's Business Daily, May 25, 2001, 2 pages.

Brewin et al., "Follow That Package!", Computer World, vol. 35, No. 12, Mar. 19, 2001, 4 pages.

Joachim, "FedEx Delivers on CEO's IT Vision", InternetWeek, Oct. 25, 1999, 4 pages.

Federal Express Information Packet, 56 pages (incl. cover and table of contents).

Sigafoos et al., "Absolutely Positively Overnight!: The Unofficial Corporate History of Federal Express", St. Luke Press, 1988, pp. 1-22.

Witt, "How to Master the Art of Returns: Automation is the Key", Material Handling Engineering, Jun. 1994, pp. 58-60.

Dilger, "The Other Direction", Manufacturing Systems, vol. 15, No. 10, pp. 12-13 (Oct. 1997).

"Computer City Moves to Consolidate Returns", Computer Retail Systems, vol. 6, No. 125, Jan. 22, 1998, 2 pages.

Dreamcom web page printout, www.dreamcomdirect.com/RMA.htm (May 25, 1997).

* cited by examiner

RF-ID

RF-ID PRODUCT TRACKING SYSTEM WITH PRIVACY ENHANCEMENT

RELATED APPLICATION

This application claims priority on U.S. Provisional Application Serial No. 60/518,326 filed Nov. 10, 2003 and entitled "RF-ID Product Tracking System With Privacy Enhancement," the entire content of which is incorporated by reference herein.

FIELD OF THE INVENTION

This invention relates to the field of retail sales and electronic registration of sales transactions. More particularly, this invention relates the use of RF-ID devices on products, and a system for using RF-ID devices on products for performing electronic registration (ER) of product transactions without invading consumer privacy or causing other undesirable conditions.

BACKGROUND AND SUMMARY OF THE INVENTION

Radio Frequency Identification (RF-ID) technology has existed for some time and provides a convenient way of tracking products as well as uniquely identifying products. An RF-ID device is a small electronic device having a memory that can be attached to a product in order to enable electronic identification of the product. Identification information, such as a serial number, as well as other information, such as manufacturer, price, UPC, manufacture date, etc., can be written to the RF-ID device and later read from the device when desired. RF-ID devices can, for example, be used in connection with inventory tracking or other applications in which it is desired to maintain information regarding the product on the product itself. Typically, RF-ID devices are loaded with information relating to the product and then attached to the product, so that the information can be read, updated or supplemented as desired using available RF-ID reading and writing equipment. Examples of RF-ID devices are shown in U.S. Pat. Nos. 5,990,794 and 5,949,335, the disclosures of which are incorporated by reference herein in their entirety.

Electronic registration (ER) of product transactions has become available for the purpose of reducing unauthorized returns of purchased products. Electronic product registrations systems provided for this purpose are disclosed in, for example, U.S. Pat. Nos. 5,978,774, 6,018,719 and 6,085,172, the disclosures of which are incorporated by reference herein in their entirety. The electronic registration system relies on the use of a unique identifier, such as a serial number, for each product that is purchased. The serial number is obtained at the point of sale for inclusion in a registration database, together with other information, such as a date of transaction. Information relating to the specific transaction may also be written to the RF-ID device at the point of sale, such as information that identifies the date of sale, the purchaser, the location of the sale, payment information (e.g., credit card, check number), etc. The registration database can then be accessed in connection with an attempted product return transaction for the purpose of determining if the product qualifies for return under applicable return criteria. Such electronic systems may also be used in connection with repair and/or exchange transactions, in addition to returns, by enabling an accurate determination as to whether the product qualifies for any of these actions under the appropriate policies and criteria under which the product was originally sold.

FIG. 1 shows an exemplary electronic registration (ER) system of the type described in the ER patents identified above. In such ER systems, products are registered at the point of sale using a unique identifier, such as a serial number, that uniquely identifies the product involved in a sales transaction. By storing the unique identifier along with a date associated with the transaction, as well as return policy information, ER enables prompt, efficient and accurate return transactions to be performed in connection with product returns using the ER system. As shown in FIG. 1, a typical ER system includes a point of sale (POS) transaction register 2, preferably having a scanner or wand 4 associated therewith. The scanner or wand enables efficient and accurate reading of information, such as a serial number, off a product, product packaging, electronic tag (such as an RF-ID tag) or other such device or indicia. The register 2 is connected to a local computer system 6 having local database 8 for storing the transaction information obtained by POS register 2. The local computer system typically has a user terminal 12 and printer 10 connected thereto for accessing and controlling the local computer system 6. The local computer system is, for example, a retailer store computer system and may be connected to other computer systems via channels 13. The local computer system 6 is also preferable connected to a central ER computer system 14 having an associated database 16 which acts as a master ER database. The central computer system 14 also includes a terminal 20 and a printer used in connection with its ER functions. The central computer system 14 is also preferably connected to other local computer systems over channels 12, so that it contains registration information from many retail locations covering many different manufacturer's products. Inasmuch as ER systems are known, and the invention is not directed specifically to an ER system itself, additional specific details regarding ER systems will not be provided herein except as needed for a better understanding of the instant invention.

While RF-ID devices and electronic registration systems have provided significant benefits in the retail/manufacturing environment, there has not been a effective system that takes advantage of both of these technologies and that does not raise privacy and/or security concerns for the consumer. Retailers, as well as large manufacturers, are eager to move from the current UPC barcode technology towards RF-ID chip technology to improve shipment accuracies and reduce sizable labor costs at various touch points in the logistics cycle. The current hype surrounding RF-ID suggests that these chips will store almost limitless information, have read/write capability, and thereby have widespread applications. Although theoretically possible, the practicality and cost of current technology, as well as concerns over consumer privacy, paint a far more conservative picture in its use and rate of adoption. Although RF-ID has been around for some time, the intended application of RF-ID is new. MIT, IBM, Intel and a host of others, including manufacturers and retailers, are currently researching two categories of use: (1) RF-ID at the "case" level, and (2) RF-ID at the "item" level.

The instant invention is directed primarily to item level RF-ID and resolving the issue over consumer privacy. One problem being encountered by RF-ID technology is the fear that, once used, anyone with an RF reader can detect and access all information about a person's belongings, which includes financial information such as credit cards, checks, the items a person is wearing, their household belongings, what the items cost, where they were purchased at, and any other private information contained on the RF-ID chip. For example, a thief could use an RF reader to identify every item in a house and their value before entering, or identify expensive items a person is wearing, such as the price of their watch, handbag, camera in their handbag, shoes, etc. In other words, by using RF-ID devices on products and storing significant amounts of confidential, private and/or useful information thereon, a host of possible privacy and security issues are raised. As a result, the benefit is using the technology is quickly overcome by the disadvantages associated with the availability of the information for unauthorized or improper purposes. Accordingly, the true benefits of using RF-ID technology to, for example, reduce improper and fraudulent product returns, has not been realized in today's environment.

The instant invention addresses these problems by providing a method and system that enables RF-ID devices to be effectively used for item level tracking and ER applications, while eliminating, or at least greatly reducing, the privacy and security concerns raised thereby. Specifically, the instant invention provides a method and system in which sensitive information is removed from the RF-ID device at the POS or other desired location, depending on the specific application in which the instant invention is employed, after that information is read for purposes of electronic registration or the like. For example, the invention involves using the information on the RF-ID device at the POS to obtain information necessary to register the product in an ER system (i.e., to obtain a unique identifier, such as a serial number), and then deleting or overwriting information on the RF-ID chip that could cause privacy or security concerns, such as the price, UPC, SKU or other similar information that provides detailed information about the product and/or the purchaser. Thus, after purchase, the RF-ID chip remains on the product but only contains the unique identifier or other type of indexing information for use in accessing related information in the ER database when the product is presented for return or the like. In accordance with the invention, the detailed product information is no longer available on the RF-ID chip after purchase, but the detailed information can still be obtained by authorized individuals, such as a returns processor, by using the unique identifier on the chip to access the detailed information in the ER database. In this way, only authorized persons can obtain the detailed information by accessing the ER database. Thus, the RF-ID device still serves the valuable purpose of identifying the product and enabling detailed information to be obtained on the product without the fear that an unauthorized individual could obtain the detailed information. In accordance with another aspect of the invention, the RF-ID chip is still useful after a product is returned and re-shelved for re-sale, because the unique identifier on the RF-ID chip can be used at the POS to access the detailed information in the ER database. Thus, an advantage of the invention is that the removing of the detailed information from the chip during the original purchase does not render the chip useless for return or re-sale purposes.

In accordance with one aspect of the instant invention, a method is provided for use in a system that uses electronic tags on products for storing information related to the products. This aspect of the invention provides a method of managing and using the information in a manner that reduces privacy concerns for purchasers of said products. The method includes the step of loading information on an electronic tag that relates to a product to which the tag is to be attached. Then, upon purchase of the product by a consumer, reading the information from the tag and storing the information in an electronic database, together with an associated unique identifier that uniquely identifies the product relative to other similar products. The product information is then erased from the electronic tag at the point of sale. In addition, he unique identifier is stored on the electronic tag and the electronic tag is maintained on the product after purchase. The unique identifier on the electronic tag is then read in connection with a post sale transaction or inquiry, and the information on the product in the electronic database is accessed using the unique identifier in order to assist with processing of the post sale transaction or inquiry. In one embodiment, loading information on the electronic tag includes preloading at least some of the information on the electronic tag by the product manufacturer or supplier. Loading information on the electronic tag may also include adding information to the electronic tag in the supply chain or by the retailer or seller of the product. Preferably, the electronic database is an electronic product registration database that includes information that enables a determination to be made as to whether or not the product qualifies for return under a return criteria under which the product was originally sold.

BRIEF DESCRIPTION OF THE DRAWINGS

These and other objects, features and advantages of the instant invention will become apparent from the following detailed description of the invention, when read in conjunction with the appended drawings, in which.

DETAILED DESCRIPTION OF THE INVENTION

The preferred embodiment of the instant invention will now be described in connection with the appended drawings. The described embodiment is not meant to limit the invention to the specific details described herein.

Figure 1:
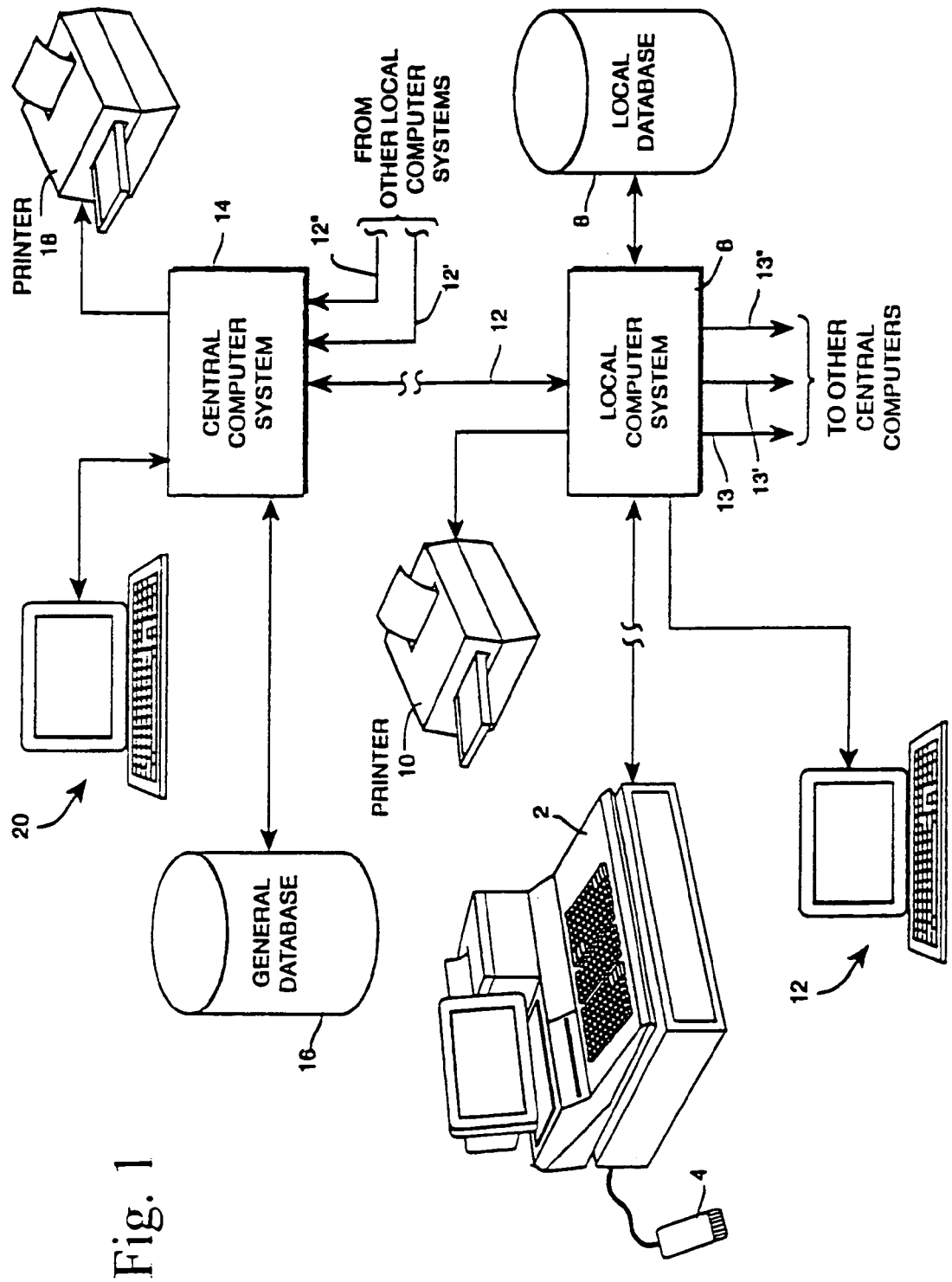
FIG. 1 shows an overall schematic diagram of a typically electronic product registration system that can be used in connection with the RF-ID/ER method of the instant invention.

As explained above, FIG. 1 shows an exemplary electronic registration (ER) system of the type described in the ER patents identified above. In such ER systems, products are registered at the point of sale using a unique identifier, such as a serial number, that uniquely identifies the product involved in a sales transaction. By storing the unique identifier along with a date associated with the transaction, as well as return policy information, ER enables prompt, efficient and accurate return transactions to be performed in connection with product returns using the ER system. In the past, the unique identifiers have been provided in the form of bar codes or the like on the products and/or product packaging. The instant invention provides a method of allowing RF-ID or other similar electronic ID devices or tags to be used instead of, or addition to, bar codes in connection with ER without causing privacy or security concerns for the purchasers of such products. As a result, RF-ID devices can be used for item level tracking as well as ER in an effective and advantageous manner.

A preferred embodiment of the system and method of the present invention will now be described. Products being offered for sale are provided with RF-ID tags which contain desired information from the manufacturer and/or retailer, such as serial number, SKU, UPC, manufacturing date, price, return qualification information etc. Thus, in addition to simply reading a unique identifier, such as a serial number, from the product, an advantage of the RF-ID device is that a variety of additional detailed information (e.g. weight, price, product description, expiration date, etc.) may be provided on the RF-ID device. In fact, manufacturers could put almost any kind of information on the RF-ID device that could later be read therefrom in connection with electronic registration either at the point of sale or at another time. In addition, further information could be written to the RF-ID device at any time, either by the manufacturer, retailer or other authorized party for almost any reason.

When a product is presented for sale, the product is brought to a sales register and the information on the RF-ID device is read using a wand or the like, including the serial number of the product. That information, and a date associated with the product transaction, is then loaded into the ER system, thereby registering the product transaction. The ER system also includes return qualification criteria that is associated with the transaction information for use in determining return qualification of the product if and when the purchaser attempts to return the product to a retailer for refund, credit or warranty. In other words, the sales assistant scans the RF-ID device to obtain the relevant information for the sale. That information is then used for the sale and some or all of that information is sent to an ER database to register the sales transaction for future reference in connection with a return or warranty transaction.

In accordance with the invention, after completing the sale, at a retailer's POS register (or equivalent), a device removes/erases all information, including the item's equivalent SKU or UPC information/number contained on the product and/or product packaging RF-ID chip. The only exception in this embodiment, would be the product "brand" name, and the individual product's unique identifier (current product serial number). The same result could be achieved by a device at the checkout counter first reading all information contained on the chip, storing it in a database, erasing all information on the chip, and then rewriting the brand and unique identifier (current serial number), or a combined number representing brand/unique identifier (current serial number), back on the RF-ID chip. Once the consumer leaves the store, a RF reader only could determine the brand name and the serial number (item unique identifier), and not any other information such as price, type of product, the retailer it was purchased from, etc. To identify a product and recover the product history (date shipped, sold date, price, retailer who sold it, returns eligibility, warranty entitlement, etc.) a person with the proper authorization would have to access the ER database and use the brand ID and serial number to retrieve the information from the database.

To process a customer item returned back to the seller, the seller's RF reader detects the brand name and unique identifier (current serial number) on the RF-ID tag, accesses the ER database and locates the original sales transaction record and information originally read from the RF-ID tag when the item was sold. Additionally, information is provided from the database and/or another database detailing the product's eligibly for return to the seller and/or back to the supplier/manufacturer, based on return qualification information available in these databases based on the sale date or other criteria. To further serve the customer, information on the individual product's warranty repair entitlement can also be accessed from a database and made available at the time the item is presented for return.

If a product is returned, the returned item can be re-shelved for re-sale. Items returned back to the seller are often in "like new" condition. Thus, the seller often desires to simply re-shelve the product for re-sale. When a re-shelved product is presented for purchase by another customer, the seller's RF reader detects the brand name and unique identifier (current serial number), accesses the ER database and locates the original sales transaction record and information originally read from the RF-ID chip when the item was first sold. Additionally, information is provided from the database and/or another database detailing the product's eligibility for return to the seller. When the item is resold, the seller's RF reader only detects the brand and unique identifier (current serial number), as all of the other information has been removed from the RF-ID chip. This enables the sellers system to retrieve all pertinent information, such as item type and price, from the database and process the sale of the item. The system appends the new sale date for the item and all other transaction information and stores it in the ER database for future use. Since all sensitive information was already purged from the RF-ID chip, and only the brand and unique identifier (current serial number) remain, no further action is needed. The new purchaser can leave with the product having the RF-ID on it without the fear that the information could be misused. If the product is returned again, the same cycle repeats itself with respect to the RF-ID information and ER database information. Thus, by using the ER database to store the detailed information on the product and product transaction and only keeping enough information on the RF-ID device to enable the detailed information to be located in the database, the RF-ID device and the ER system work together to achieve significant benefits for the manufacturer, retailer and customer without the fear that the information originally on the RF-ID device could be misused in a way that would violate customers privacy or compromise their security.

Figure 2:
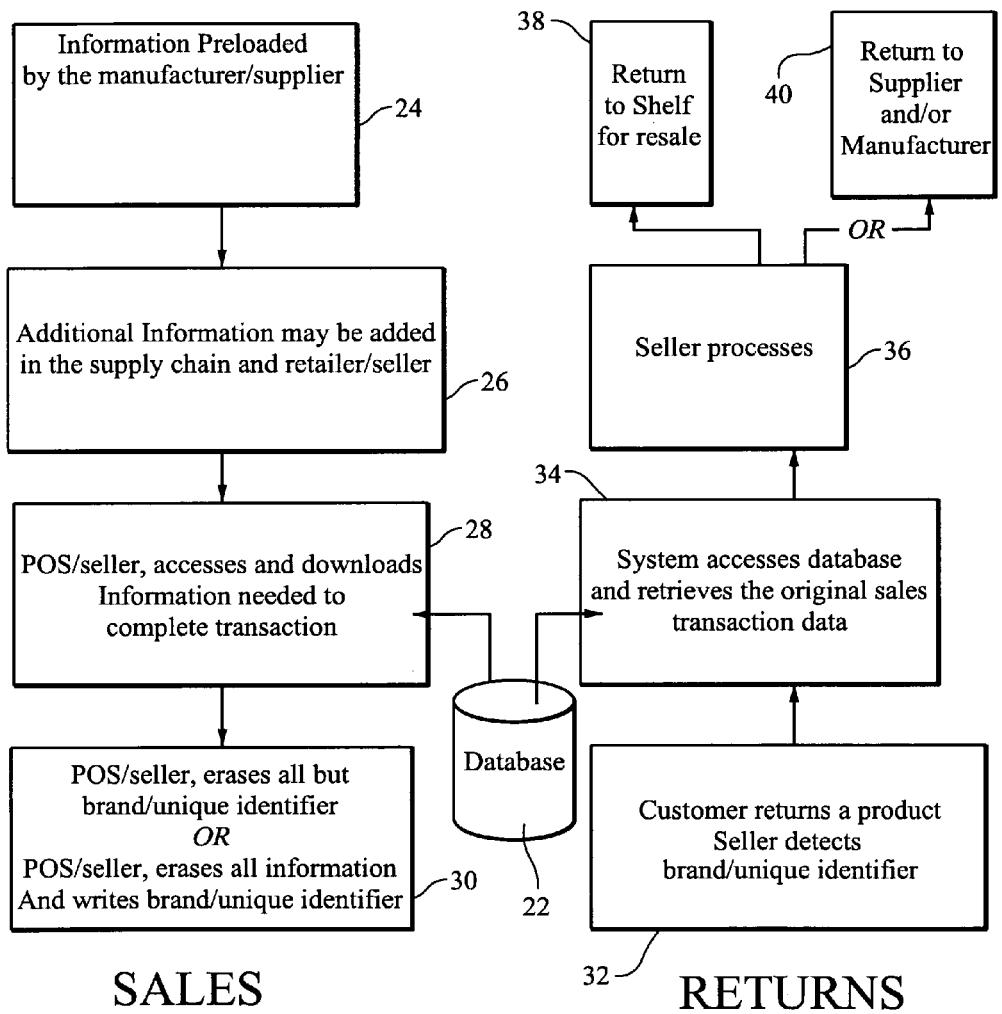
FIG. 2 shows a general flow chart of the main steps performed in accordance with a preferred embodiment of the RF-ID/ER method of the present invention.

FIG. 2 shows a high-level flow chart of a preferred embodiment of the RFID/ER method of the instant invention. In accordance with the method of the instant invention, the vendors and/or manufacturers put RF-ID devices on their products prior to shipping the products to a retail location for sale (24). The RF-ID device may take any known suitable form such as an RF-ID tag or other type of tag. While tags operating by RF signals are preferred, other suitable technology that provides a similar identification function may also be used within the scope of the instant invention. In other words, the invention is not limited to RF devices. The manufacturer may write or load any desired information (in additional to the unique identifier) onto the device prior to or after attaching the device to the product. The information added is preferably information that the manufacturer desires to have added to the ER database (22) for later reference. After the products having the RF-ID devices are ready, the products are shipped in a conventional manner to the retailers that sell the products.

When a retailer receives products having RF-ID tags, the retailer offers the products for sale along with, for example, other products not having such ID devices. When a product having an RF-ID device (or other ID device) is brought to the point of sale location for purchase, the sales associate at the store reads the serial number (or other unique identifier) off the product using a scanner, or from the RF-ID device itself using an RF wand, thereby obtaining the necessary unique identifier for enabling the product to be registered in the transaction database (22), in the manner described in the electronic registration patents identified above (28). In addition to simply reading a unique identifier, such as a serial number, from the product, an advantage of the RF-ID device is that a variety of additional detailed information (e.g. weight, price, product description, expiration date, etc.) may be provided on the RF-ID device. In fact, manufacturers could put almost any kind of information on the RF-ID device that could later be read therefrom in connection with electronic registration either at the point of sale or at another time. In addition, further information could be written to the RF-ID device at any time, either by the manufacturer, retailer or other authorized party for almost any reason (26). The information read, including the serial number of the product and a date associated with the product, is then loaded into the ER system, thereby registering the product transaction. The ER system also includes return qualification criteria that is also associated with the transaction information for use in determining return qualification of the product if and when the purchaser attempts to return the product to a retailer for refund, credit or warranty.

In accordance with the invention, the sales associate then erases all of the sensitive information from the RF-ID device, thereby only leaving the brand and the unique identifier (30). It is also possible to only leave the unique identifier; however, leaving the brand information reduces the number of serial numbers required by allowing a series of serial numbers to be used for each brand. Another option is to erase all of the information from the RF-ID device and then write the brand and unique identifier back to the RF-ID device. Either way, the detailed information is provided to the ER system and only limited information remains on the RF-ID device. Thus, the RF-ID device and the ER system work together to provide the benefits of each without causing privacy or security concerns.

As shown on the right side of FIG. 2, when the customer returns a product having an RF-ID thereon, the seller detects the brand and unique identifier information and uses that information to retrieve the original sales transaction data from the ER database (22, 32). This information enables the seller to determine if the product qualifies for return based on the appropriate return policy under which the product was originally sold (34, 36). If the seller accepts the return, the seller may either return the product to the shelves for resale (38) or return the product to the supplier or manufacturer (40). If the product is re-shelved, the limited information on the RF-ID device can again be used to obtain the detailed information that was originally on the RF-ID device from the ER database (22). Thus, the RF-ID device still serves its intended function even after the product is sold and returned.

As can be understood from the description of the invention herein, the invention combines the benefits of ER with the benefits of RF-ID devices to provide a system which takes advantage of both of these technologies without causing privacy or security concerns for consumers. For example, by removing the detailed information from the RF-ID device at the POS, unauthorized individuals will not be able to obtain that information. However, the detailed information will still be available to authorized individuals through the ER system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the invention.

What is claimed is:

1. In a system that uses electronic tags on products for storing information related to the products, a method of managing and using the information in a manner that reduces privacy concerns for purchasers of said products, said method comprising:
   loading information on an electronic tag that relates to a product to which the tag is to be attached;
   upon purchase of the product by a consumer:
      reading the information from the tag,
      generating an associated unique identifier that uniquely identifies the product relative to other similar products,
      storing the information read from the tag in an electronic database, together with the associated unique identifier that uniquely identifies the product relative to other similar products, and
      erasing the product information from the electronic tag at the point of sale;
   storing the unique identifier on the electronic tag and maintaining the electronic tag on the product after purchase;
   reading the unique identifier on the electronic tag in connection with a post sale transaction or inquiry, and accessing the information on the product in the electronic database using the unique identifier in order to assist with processing of the post sale transaction or inquiry.

2. The method of claim 1, wherein loading information on the electronic tag includes preloading at least some of said information on the electronic tag by the product manufacturer or supplier.

3. The method of claim 1, wherein loading information on the electronic tag includes adding information to the electronic tag in the supply chain.

4. The method of claim 1, wherein loading information on the electronic tag includes adding information to the electronic tag by the retailer or seller of the product.

5. The method of claim 1, wherein the electronic database is an electronic product registration database that includes information that enables a determination to be made as to whether or not the product qualifies for return under a return criteria under which the product was sold.

6. The method of claim 1, further including accessing the database at the point of sale in order to obtain information needed to complete the sales transaction.

7. The method of claim 1, wherein the post sales transaction is a product return request and the information from the database is used to determine if the return request should be accepted or rejected.

8. A method of using electronic tags, that provide information of products, in a manner that reduces privacy concerns for purchasers of said products, said method comprising:
   loading information on an electronic tag that relates to a product to which the tag is attached;
   upon purchase of the product by a consumer:
      reading the information from the tag,
      generating an associated unique identifier that uniquely identifies the product relative to other similar products,
      storing the information read from the tag in an electronic database, together with the associated unique identifier that uniquely identifies the product relative to other similar products, and
      erasing the product information from the electronic tag at the point of sale; and
   storing the unique identifier on the electronic tag and maintaining the electronic tag on the product after purchase.

9. The method of claim 8, wherein loading information on the electronic tag includes preloading at least some of said information on the electronic tag by the product manufacturer or supplier.

10. The method of claim 8, wherein loading information on the electronic tag includes adding information to the electronic tag in the supply chain.

11. The method of claim 8, wherein loading information on the electronic tag includes adding information to the electronic tag by the retailer or seller of the product.

12. The method of claim 8, wherein the electronic database is an electronic product registration database that includes information that enables a determination to be made as to whether or not the product qualifies for return under a return criteria under which the product was sold.

13. The method of claim 8, further including accessing the database at the point of sale in order to obtain information needed to complete the sales transaction.

* * * * *